Aug. 10, 1926.
J. V. WINTER
1,595,844
LIGHT BRACKET
Filed Nov. 13, 1925
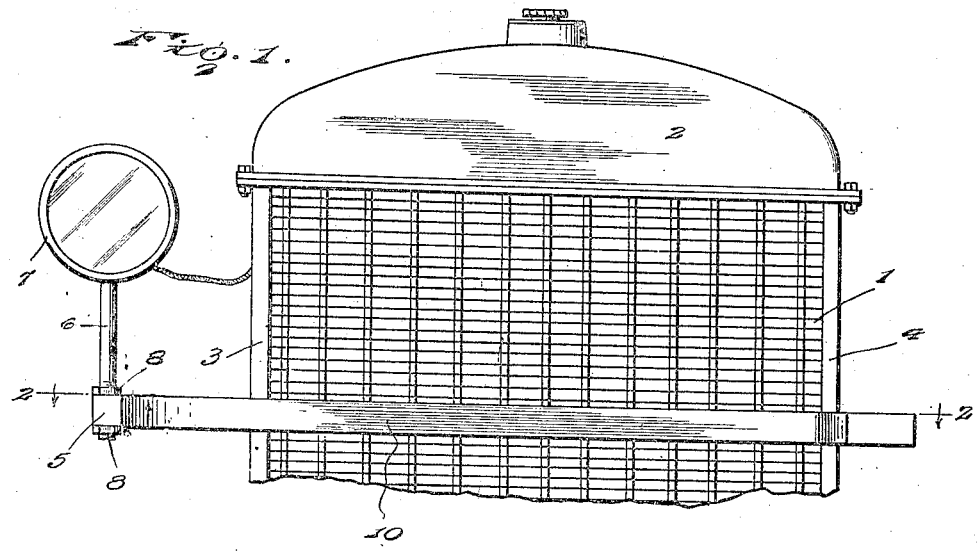
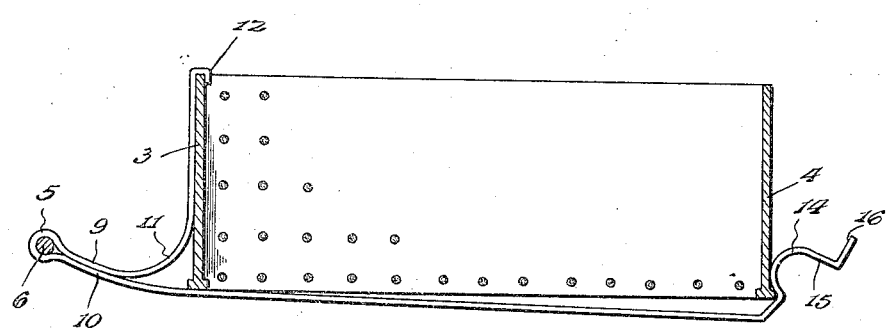
Inventor
J. V. Winter.
By Lacey & Lacey, Attorneys Patented Aug. 10, 1926.

1,595,844

UNITED STATES PATENT OFFICE.

JESSE V. WINTER, OF KENNAN, WISCONSIN.

LIGHT BRACKET.

Application filed November 13, 1925. Serial No. 68,855.

This invention relates to a bracket for use in connection with a motor vehicle and preferably for use in connection with a motor vehicle of the tractor type. One object of the invention is to provide a bracket which is so constructed that a headlight may be carried by the bracket and the bracket secured to the radiator of the tractor with the headlight disposed at one side of the radiator.

Another object of the invention is to so construct the bracket that it may be readily snapped into gripping engagement with the radiator and be securely held in place by its own resiliency.

Another object of the invention is to provide a bracket which may be formed from a single strip of resilient metal bent to provide a lamp-carrying portion and radiator-engaging arms. This permits the bracket to be cheaply produced and at the same time provides a bracket which will be of a simple construction and easy to put in place or removed.

This invention is illustrated in the accompanying drawing, wherein—

Figure 1 is a view in front elevation showing the bracket applied to a radiator and supporting a headlight;

Fig. 2 is a transverse sectional view taken on the line 2—2 of Fig. 1, and

Fig. 3 is a top plan view of the bracket as it would appear before being applied to the radiator, the dotted lines indicating the amount the bracket would be distorted when put in place.

In the accompanying drawing, the numeral 1 indicates a radiator which is of a conventional construction and of the type generally used in connection with tractors. It is provided with the usual frame which includes a head 2 and side walls 3 and 4 which are in the form of metal plates. The bracket which forms the subject-matter of this invention is formed from a strip of resilient metal which is bent intermediate its length to form an eye or socket 5 open at its upper and lower ends and adapted to receive the post 6 of the headlight 7. The post is passed downwardly through the socket and when the securing nuts 8 are tightened the headlight will be firmly connected with the bracket and prevented from turning out of a position to direct its light ahead of the tractor. Arms 9 and 10 extend from the eye or socket 5 and have contacting engagement with each other for a short distance from the socket. The arm 9 which is shorter than the arm 10 is then curved rearwardly, as shown at 11, and extends rearwardly from the arm 10 at substantially right angles thereto. From an inspection of Fig. 3, it will be seen that the arm 9 does not normally extend from the arm 10 at an exact right angle but may be forced into a position at substantially right angles to it when applied to the radiator. At its free end the arm 9 is bent to provide a hook 12, the bill of which extends towards the arm 10 and permits the arm 9 to have firm engagement with the rear edge of the side wall 3 of the radiator. The arm 10 which is of greater length than the arm 9 will extend across the radiator for the full width thereof. The free end portion of the arm 10 is bent rearwardly at an outward incline, as shown at 13, and is then bent to provide an inwardly extending U-shaped latch 14, the arm 15 of which is extended outwardly and bent to provide a lip 16 so that the free end of the arm 10 may be readily grasped by means of the lip and the bracket easily forced into proper engagement with the radiator.

When this bracket is to be put in place, the hook 12 is brought into engagement with the rear edge of the side wall 3 of the radiator frame and the bracket is then grasped adjacent the socket 5 with one hand and by the bill and arm 15 of the latch 14 with the other hand. The arm 10, of course, extends in front of the radiator but quite an effort is required in order to force the latch portion 14 into gripping engagement with the forward portion of the side wall 4 of the radiator, as shown in Fig. 2. This is due to the fact that the distance between the hook 12 and the arm 10 is normally slightly less than the depth of the radiator frame and the distance between the rearwardly extending portion of the arm 9 and the latch 14 is normally slightly less than the width of the radiator. Therefore, when the hook is engaged with the wall 3 at its rear edge, the spring portion 11 of the arm 9 must be forced out of its normal curvature in order to permit the rearwardly extending portion of the arm 9 to be brought into flat contacting engagement with the side wall 3 of the radiator and the latch 14 snapped into gripping engagement with the forward portion of the side wall 4 of the radiator. The rearwardly extending portion 13 of the arm 10 will also be forced out of its normal incline shown in full lines in Fig. 3 to the position indicated by dotted lines in this figure and, therefore, a very tight binding action will take place which will serve to securely hold the bracket in engagement with the radiator and prevent it from slipping out of engagement with it. When it is desired to remove the bracket, it is simply necessary to grasp the bill 16 and by a forward pull move the latch out of enagement with the wall 4 of the radiator. This will release the bracket and can be very easily moved to disconnect the arm 9 from the wall 3. It will, therefore, be seen that this bracket can be very easily put in place or removed and that, when in place, it will not be liable to slip loose of its own accord.

Having thus described the invention, I claim:—

A bracket comprising a strip of resilient material bent intermediate its length to form a socket and arms extending therefrom, one arm contacting with the other for a portion of its length and being then curved away from the second arm and projecting transversely thereof and terminating in a support engaging hook, the second arm having its free end portion bent transversely to provide an extension formed with an arcuate latch adapted to be sprung into gripping engagement with the support at the opposite side thereof from the first arm.

In testimony whereof I affix my signature.

JESSE V. WINTER. [L. S.]